United States Patent [19]
Solko

[11] Patent Number: 4,753,556
[45] Date of Patent: Jun. 28, 1988

[54] PORTABLE DRILL AND CLAMPING APPARATUS THEREFOR

[76] Inventor: John D. Solko, 10228 Prince Pl, T3, Largo, Md. 20772

[21] Appl. No.: 823,735

[22] Filed: Jan. 29, 1986

[51] Int. Cl.[4] .............................................. B23B 45/08
[52] U.S. Cl. ...................................... 408/16; 408/61; 408/108
[58] Field of Search ................... 408/1 R, 78, 79, 87, 408/95, 99, 100, 101, 102, 103, 108, 109, 68, 59, 16; 51/178, 241 LG; 173/32, 37, 149

[56] References Cited

U.S. PATENT DOCUMENTS

| | | | |
|---|---|---|---|
| Re. 30,519 | 2/1981 | Hougen | 408/76 |
| 286,298 | 10/1883 | Hart . | |
| 1,221,708 | 4/1917 | Dyer . | |
| 1,421,194 | 6/1922 | Everett | 408/99 |
| 2,203,415 | 6/1940 | Lavarack et al. . | |
| 2,599,696 | 4/1947 | Clark . | |
| 2,629,267 | 2/1953 | Hart | 408/100 |
| 2,997,900 | 8/1961 | Pugsley | 408/112 |
| 3,068,721 | 12/1962 | Ausenda et al. | 408/16 X |
| 3,273,424 | 9/1966 | Hughes . | |
| 3,706,505 | 12/1972 | Stougaard | 408/78 |
| 3,836,276 | 9/1974 | Cloup | 408/16 |
| 3,945,749 | 3/1976 | McIlrath | 408/95 |
| 3,969,036 | 7/1976 | Hougen | 408/76 |
| 4,047,827 | 9/1977 | Hougen | 408/76 |
| 4,090,804 | 5/1978 | Maley | 408/68 |
| 4,204,783 | 5/1980 | Hougen | 408/68 |
| 4,261,673 | 4/1981 | Hougen . | |

Primary Examiner—Z. R. Bilinsky
Attorney, Agent, or Firm—Lowe, Price, LeBlanc, Becker & Shur

[57] ABSTRACT

Apparatus and method are disclosed for enabling a single operator to correctly position and clamp a power tool, such as a drill, onto a rail or beam-shaped workpiece. The apparatus has an adjustable clamp, comprising gauge blocks that provide snug multi-point stable contact with the workpiece in cooperation with a movable guided jaw. A sight hole ensures correct positioning of the clamp by direct viewing of a mark on the workpiece. A thrust bearing positioned between the movable clamp jaw and a clamp locking nut facilitates clamping and unclamping in repeated use and permits the application of a clamping force sufficient to carry the weight of the entire apparatus, including a power-tool attached to the clamp. The drill, including a hollow centrally-lubricated annular drill bit, is manually guided into the workpiece along guide rails attached to the clamp in the same plane as the drill axis for maximum stability during operation in any orientation.

12 Claims, 4 Drawing Sheets

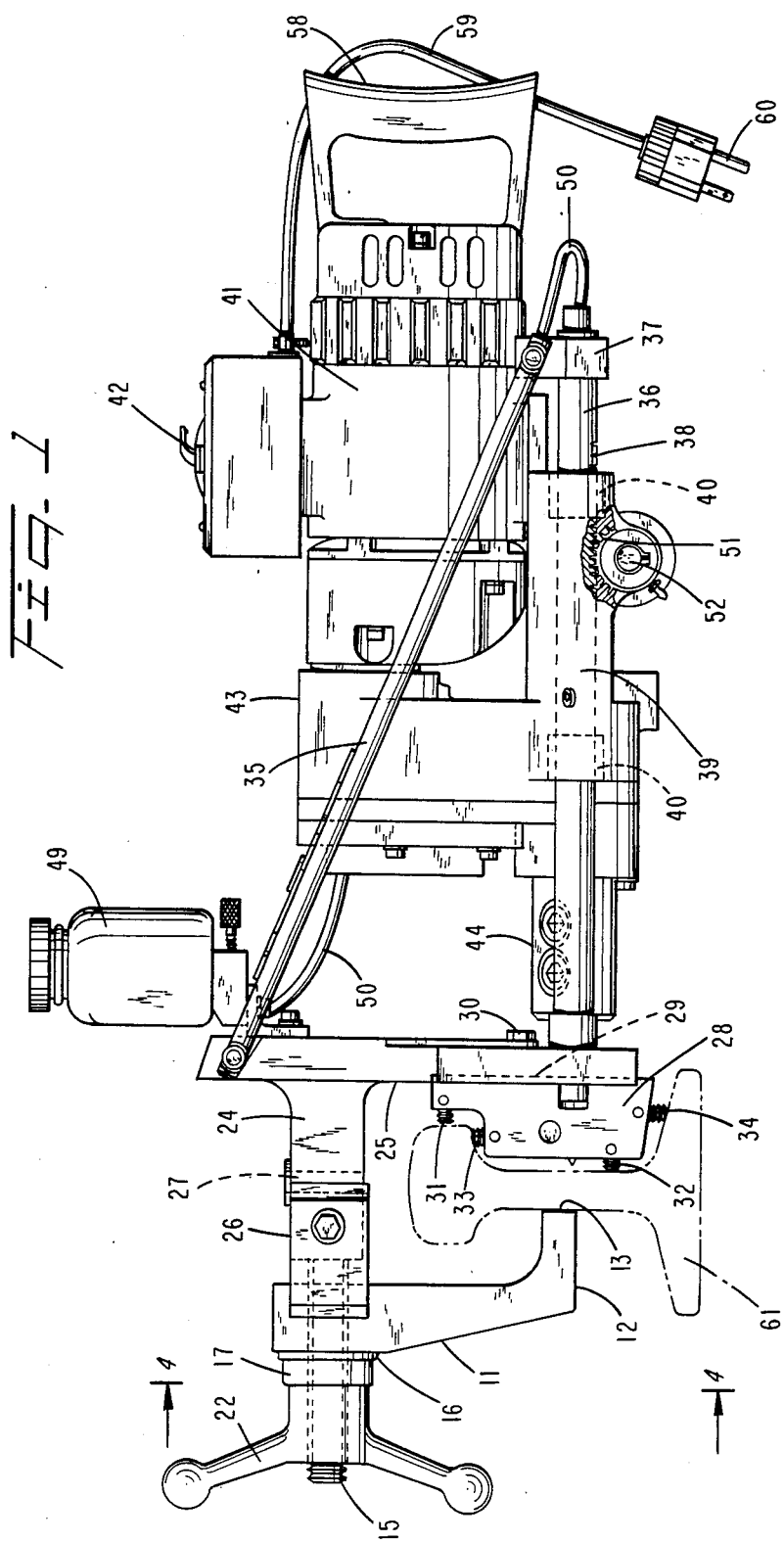

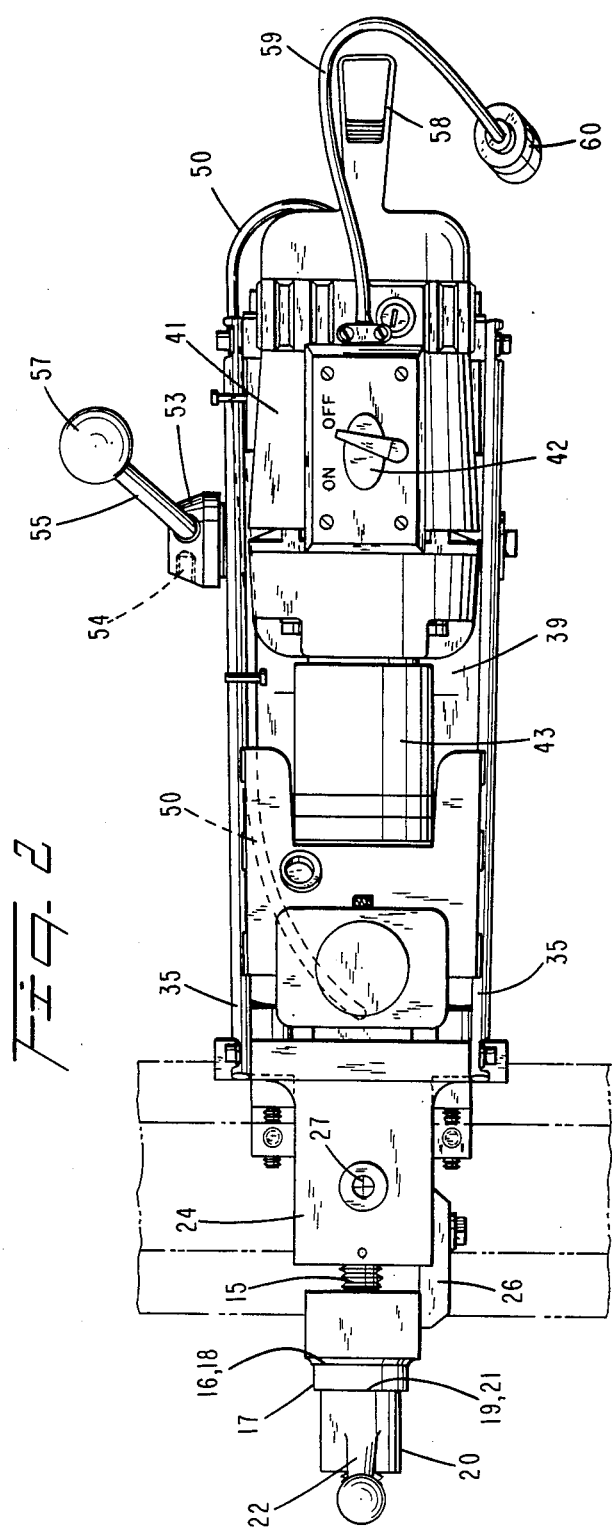

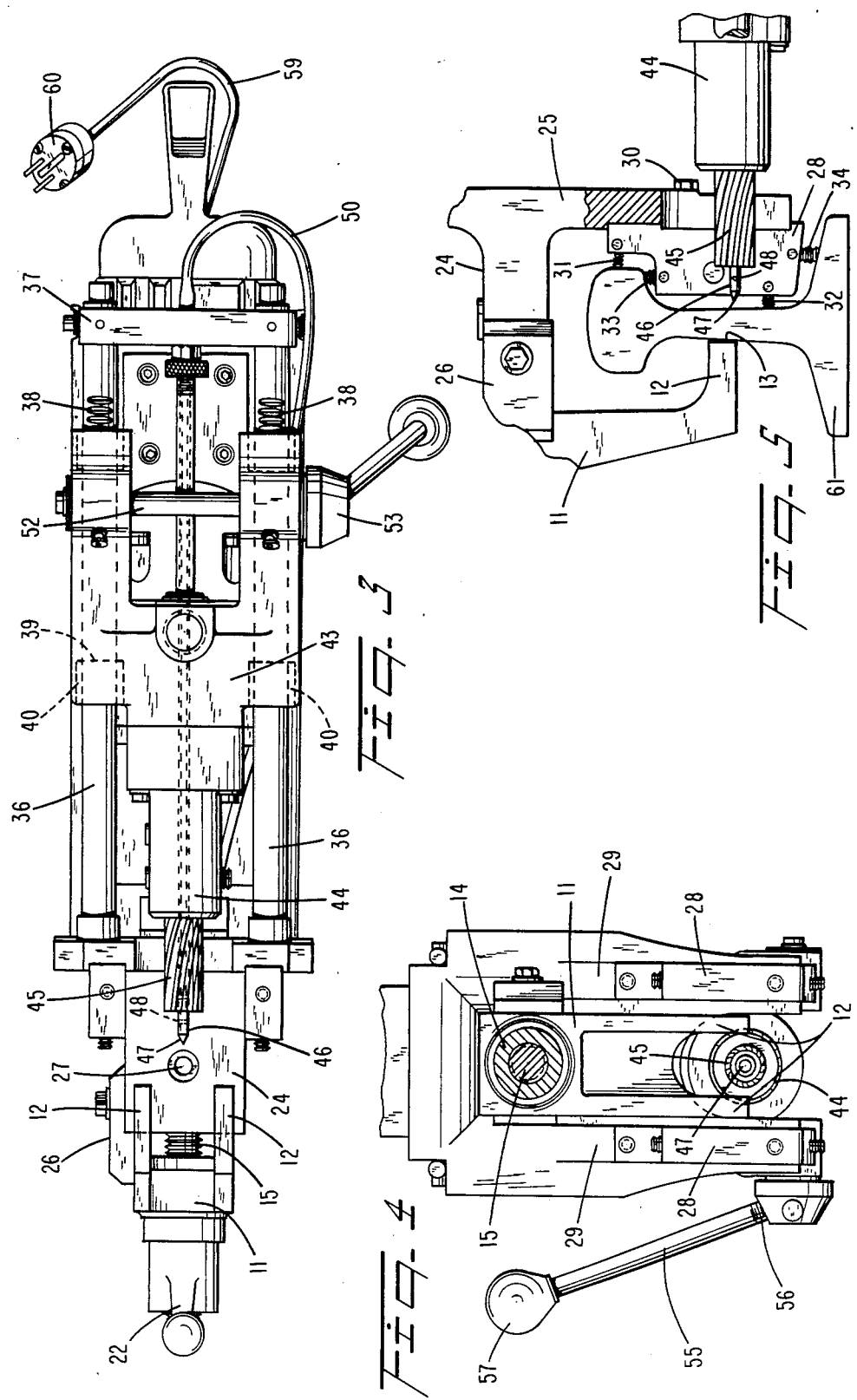

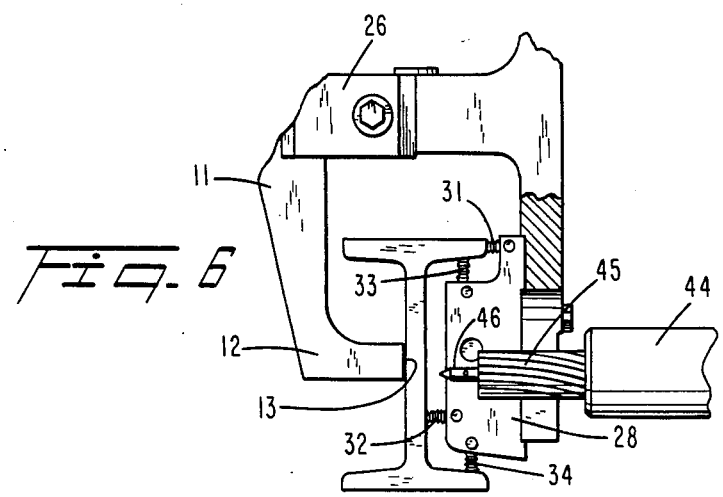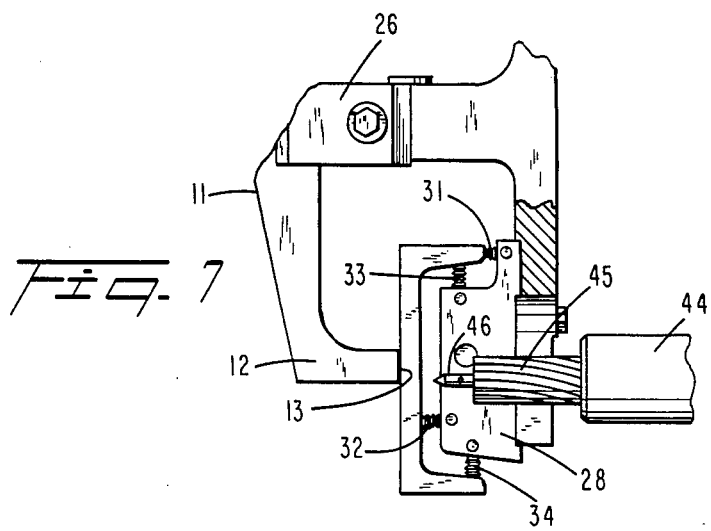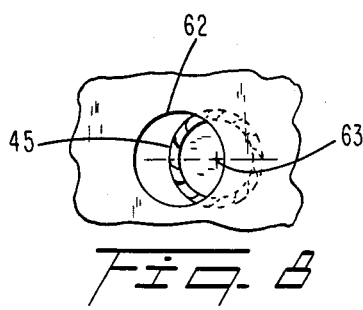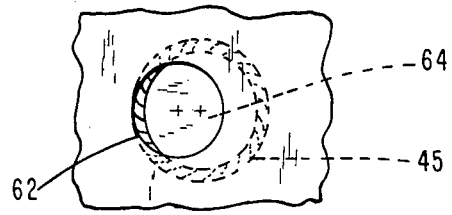

PORTABLE DRILL AND CLAMPING APPARATUS THEREFOR

TECHNICAL FIELD

This invention relates generally to apparatus for repeatedly drilling holes in elongate workpieces and, more particularly, to a portable rail drill suitable for drilling plural holes adjacent a rail joint for attachment by fishplates of sections of rail abutting at the joints, and a light-weight clamping mechanism for securing the apparatus to the rail.

BACKGROUND ART

In a railroad road bed, conventional rails each having a base with a web extending upward therefrom to a head or crown are typically joined together, by fishplates which lap the ends of adjacent rails and are bolted to the webs thereof. To facilitate alignment of the bolt holes in the fish plate and in the web, the holes in the web of the rail may be drilled in the rail when it is in place in the road bed. If a particular rail segment is worn or damaged, then a replacement rail must match the one it replaces. To ensure correct alignment of each rail segment, it is often desirable first to set adjacent segments in place, and only tnen drill holes on site, through the web of each segment to accommodate fastening bolts as aforesaid.

The above described activity is often carried out in remote locations, at times under emergency conditions and sometimes in confined areas, e.g., a tunnel. Regardless of the difficulty of drilling through hard, tough steel under such circumstances, it is essential that the holes be precisely located and quickly and cleanly drilled. The apparatus of choice for this purpose is a rail drill, optionally powerable by a choice of power sources, which can be quickly and precisely aligned and operated by a single trained operator, and which is light enough to be comfortably carried by the operator from rail to rail on site. Suitable power sources for this purpose include electric motors (a.c. if a generator is available, or d.c. if a battery is used) or hydraulic or pneumatic motors (if a high pressure fluid, such as water or air, respectively, is available).

Examples of patents issued on railroad drills include U.S. Pat. No. 3,273,424 to Hughes disclosing a railroad drill whose height above the crown of the rail to which it is clamped, to drill one or more holes in the web thereof, is adjustable by two screws. The vertical locations of holes are referenced to the top of the rail crown, hence wear of the crown must be correctly determined and allowed for in using the drill. Also, accidental or careless change in their adjustment could result in serious error in vertically positioning the holes. The Hughes drill is long enough to span the gap between conventionally spaced parallel rails and uses both rails to support its weight in use and, therefore, would be unsuitable for use on a single rail or dangerous when it is necessary to drill between a rail and a live third rail.

U.S. Pat. No. 3,706,505 to Stougaard, discloses a portable railroad drill which clamps onto the crown of the rail to be drilled and is partially supported by a pair of adjustable ground-engaging legs. The Stougaard drill can be adjusted vertically with respect to the clamped rail crown and can be positioned along the rail at preselected locations once the clamp is tightened onto the rail. Careful vertical adjustment, taking rail wear into account, would be required to avoid vertical hole-position errors.

U.S. Pat. No. 3,945,749 to McIlrath discloses a clamping apparatus for a railroad drill which employs a ground-engaging support remote from the clamp. The McIlrath clamping mechanism comprises a pair of long cylindrical drill-unit supporting guide rods above both the rail and the drill axis. The movable jaw of the McIlrath clamp is guided to move normal to the rail by an aperture therein sliding over a cantilevered rod protruding from the clamp head. The McIlrath clamp employs a pair of clamping blocks to fit the rail profile on the drill side. Both the McIlrath and Stougaard drills appear to be both bulky and heavy, requiring an operating crew at least two workmen to move them about and to align them correctly with respect to the workpiece particularly in adjusting the ground support.

A need exists, therefore, for a light portable railroad drill mechanism that can be carried and operated in relatively confined quarters by a single trained operator, which clamps onto a rail or other workpiece at a vertical web without needing alignment with respect to a wearing surface of the workpiece. It should, preferably, allow the use of the most advanced drill bits for operation by a variety of power sources.

It is accordingly an object of the present invention to provide a drill having a light, sturdy, and highly portable power drill clamping mechanism that can be easily carried and operated by a single operator.

Another object of this invention is to provide a power drill mechanism that is easily and firmly clamped precisely at predetermined locations marked on a workpiece to be drilled.

Yet another object of this invention is to provide a railroad drill mechanism that can repeatedly drill holes precisely at a predetermined height with respect to the non-wearing profile of the rail being drilled.

A further object of this invention is to provide a railroad drill mechanism that provides for controlled manual feeding of the drill bit in confined spaces.

Yet a further object of this invention is to provide a railroad drill mechanism with an efficient self-oiling annular drill bit.

An even further object of this invention is to provide a clamping apparatus that can be used to clamp a drill to a railroad tie, beam or the like at any orientation of the drill irrespective of the ground surface.

DISCLOSURE OF THE INVENTION

These and related objects of this invention are achieved by providing a light, sturdy and portable power drill apparatus which can be firmly clamped onto an elongate workpiece, e.g., a railroad rail or an I-beam, and can be solely supported thereby. The clamping portion of the apparatus comprises a movable first clamping jaw engageable with a first nonwearing side of the workpiece. The first clamping jaw is slidably supported on a shaft connected to the apparatus. A second clamping jaw connected to the shaft has clamping surfaces adjustable in profile to contact in clamping engagement a second non-wearing side of the workpiece in cooperation with the first clamping jaw. The first jaw is urged towards the second jaw on the shaft by means of a hand wheel to clamp the workpiece therebetween. To maintain the first clamping jaw in proper alignment with the second jaw as the first jaw moves into clamping contact with the workpiece, a guide plate connected to a clamp plate head mounted on the support shaft is provided in contact with the movable first jaw. The clamp plate head extends above and between the first and second jaws and is formed with a line of sighthole permitting visual detection of a marked location on the workpiece to facilitate rapid and accurate positioning of the apparatus relative to the workpiece.

In accordance with another aspect of the invention, the first and second clamping jaws cooperate with each other to apply a clamping force to the first side of the workpiece, wherein the clamping force generates a plurality of reaction forces with the second clamping jaw on the second side of the workpiece such that at least two of the reaction forces have significant components oppositely directed from each other along the lines substantially normal to the direction of the clamping force. The sum of the clamping and reaction forces totally supports the weight of the apparatus when clamped to the workpiece, irrespective of the orientation of the workpiece relative to a ground surface.

In accordance with another aspect of the invention, the clamping apparatus is preferably connected to a power tool with a tool bit, utilizing guide rods along which the power tool travels. The axes of the guide rods are preferably coplanar with the tool bit axis and located in approximately the same elevational position as a pair of prongs of the first clamping jaw engaging the workpiece.

In accordance with another aspect of the invention, the first clamping jaw is preferably moved into contact with the workpiece by means of a hand wheel threadedly mounted on the support shaft. A thrust bearing is provided between the first clamping jaw and hand wheel to transmit force from the wheel to the jaw and enable a sufficient clamping force to be applied to the workpiece and permitting easy disengagement of the clamp by oppositely directed rotation of the hand wheel.

In accordance with a further aspect of the invention, the tool bit is preferably a drill bit formed with an annular cylindrical portion provided with plural cutting teeth at one end thereof. Fluid is delivered into a hollow central region of the annular drill bit to be directed in a radially outward flow therefrom at the cutting edges for efficient drilling. Fluid flow is preferably gravity fed. A plug ejector located within the annular hollow portion of the drill bit is provided to eject a central plug machined out of the workpiece.

In accordance with yet another aspect of the invention, a method for drilling holes in a workpiece is also provided, comprising the steps of marking a location for drilling a hole in the workpiece and then selecting two gauge blocks, each having a shape to fit a first side of the workpiece adjacent the desired location of the hole such that each of the gauge blocks contacts that side in corresponding locations at plural points. The gauge blocks are then attached to an apparatus for clamping to the workpiece a power tool provided with the drill bit. The clamping apparatus is placed directly onto the workpiece adjacent the marked location and then positioned with respect thereto to ensure correct location of the drill bit with respect to the workpiece guided by the gauge blocks. The clamping apparatus is then locked into place by executing a sufficient clamping force on a second side of the workpiece such that of the reaction forces generated thereby between the gauge blocks and the workpiece at least two of the reaction forces at each of the gauge blocks have significant components oppositely directed from each other along a line substantially normal to the direction of the clamping force and the weight of the apparatus is supported solely by the upward component of net resultant of all of the forces. The tool, thusly clamped, is operated to drill a hole.

Still other objects of the present invention will become readily apparent to those skilled in the art from the following description, wherein there is shown and described a preferred embodiment of this invention simply by way of illustration of one of the best modes contemplated for carrying out the invention. As will be realized, the invention is capable of other embodiments, and its several details are capable of modifications in various, obvious aspects all without departing from the invention. Accordingly, the drawings and descriptions will be regarded as illustrative in nature and not as restrictive.

BRIEF DESCRIPTION OF THE DRAWING

FIG. 1 is a side elevational view of a clamping apparatus for supporting a machine device of the present invention clamped to a rail;

FIG. 2 is a top plan view of the apparatus of FIG. 1;

FIG. 3 is a bottom plan view of the apparatus of FIG. 1;

FIG. 4 is a sectional view taken along the line IV—IV of FIG. 1;

FIG. 5 is a partial sectional view showing the positioning of the clamping elements relative to the workpiece and a machining element of the power tool;

FIGS. 6 and 7 are views similar to FIG. 5 showing the invention in clamping engagement with different forms of beams;

FIGS. 8 and 9 are partial detailed views of second holes drilled into a workpiece with the apparatus of the present invention; in particular, FIG. 9 shows how an existing small hole may be replaced by a larger hole, optionally at a different center, while FIG. 8 shows how a second hole can be drilled with the apparatus offset with respect to the first hole.

The same numbers are used to identify like elements, or part of elements, in each of the drawings and for purposes of reference elsewhere in this specification.

BEST MODE FOR PRACTICING THE INVENTION

As clearly depicted in FIGS. 1 and 5, a workpiece 61, e.g., a rail, is very firmly clamped between a movable clamp jaw 11 and a pair of spaced apart gauge blocks 28 attached to a clamping plate 25 on the other side of the workpiece. Sight hole 27, adjacent external clamp guide 26 in clamp head 24 atop clamping plate 25, facilitates easy and precise location of the clamp vis-a-vis the workpiece, and suitably configured adjustable clamping blocks 28 provide multipoint precise contact with workpiece 61 via block setting pins 31-34. Thrust bearing 17 facilitates quick application of a clamping force that is sufficient to ensure that the clamp action by itself fully supports the weight of a power tool, comprising a rotary motor 41 turning a tool, e.g., hollow centrally lubricated drill-bit 45, on guide rods 36 positioned to be in the same plane as the axis of drill bit 45 for maximum stability during operation. The entire apparatus is geometrically compact and light enough for one person to carry and use, in a confined space, in any orientation.

As shown in FIGS. 1 and 3, movable clamp 11 includes two downwardly depending prongs 12 spaced apart to avoid contact with a drill bit 45 coming through workpiece 61 from the other side. Each prong 12 has a horizontal prong tip 13. Aperture 14 in the clamp head 24 permits longitudinal, sliding movement of the jaw 12 on a threaded clamp support stud 15. Also slidably carried on clamp support stud 15, adjacent the clamp outside face 16, is a thrust bearing 17. The inner race 65 of thrust bearing 17 has a circular flat annular surface 18 that can contact the clamp outside face 16. The outer race 66 of thrust bearing 17 has a flat circular annular surface 19 on the other side. Adjacent surface 19 of the thrust bearing 17 is a clamp locking nut 20 threaded onto the clamp supporting stud 15. When clamp locking nut 20 is tightened onto stud 15, a clamp locking nut front face 21 is pressed onto face 19 of the thrust bearing. Clamp locking nut 20 is provided, in the embodiment shown in the figures, with two tightening handles 22. Clamp locking nut 20 is provided with threads 23 all the way through.

Provision of thrust bearing 17 ensures that tightening of clamp locking nut 20 will be relatively easy because of the low friction between thrust bearing inner and outer races (not numbered) while the full clamping force is transmitted therethrough. Likewise, the unclamping operation also will be made easy by the presence of thrust bearing 17.

Clamp support stud 15 is threaded into clamping plate head 24 of clamping plate 25. Attached to one side of clamping plate head 24 is a flat clamp guide 26. This flat guide 26 is positioned close to movable clamp 11 so as to permit free sliding movement thereof but to prevent any significant rotation of the clamp jaw 12 about clamping support stud 15. The combination of clamp guide 26 and thrust bearing 17 ensures that no matter how much torque is applied to clamp locking nut 20 via handles 22 there is no noticeable rotation of the clamp jaw 12 and hence no corresponding sideways motion of clamp prong tips 13. Proper alignment of clamp 11 with gauge blocks 28 is then assured.

Clamping plate head 24 includes a downwardly directed sight-hole 27 through which an operator can view a mark on a rail 61 below to align the clamp head with respect to the rail (FIG. 2). This is a highly advantageous feature of this invention as it is almost always easy to clearly see and to clearly mark the top of the rail to determine where the holes in the web are to be drilled below. Even when working under adverse conditions, as in a tunnel or in a very confined space, e.g., between other rails or a nearby wall, the operator can use a small flashlight to augment available lighting, if necessary, to precisely position the apparatus. Other alternatives for obtaining such precise positioning of the apparatus, e.g., viewing the drill tip from the side to align it with a mark on the web, are much more complex, difficult and likely to lead to errors.

At the side of the rail 61 away from the clamp prongs 13 are two gauge blocks 28 received in parallel vertical channels 29 and bolted to clamping plate head 24 with bolts 30, as shown in FIG. 1. Each gauge block 28 is provided with threaded-in stud type gauge block setting pins as follows: upper and lower horizontal gauge block setting pins 31 and 32, respectively, and upper and lower vertical gauge block setting pins 33 and 34, respectively, on each gauge block. When the apparatus of this invention is to be used to drill holes in the web of railroad type rails, typified by rail section 61 in FIG. 12, setting pins 31 through 34 are preadjusted on both the gauge blocks taken together to ensure exact contact with the side of the crown, the underside of the crown, the web and the upper side of the rail base, respectively.

This is best understood by reference to FIG. 1. Note that since the top of the rail crown is never used for alignment purposes in this invention there can be no errors during use of the apparatus generated by wear of the rail crown.

Attached to the top of clamping plate 25, one on each side thereof, are two clamping plate bracing struts 35. Likewise, below each such junction of a bracing strut 35 and the clamping plate 25 are attached drill guide rods 36, one on each side, to the lower portion of clamping plate 25. The far ends of parallel drill guide rods 36 pass through and are firmly held apart by a spacer bar 37. The far ends of clamping plate bracing struts 35 are also firmly attached to spacer bar 37, one on each side. The clamping struts 35, the guide rods 36 and clamping plate 25 form rigid firm triangles, one on each side of the clamping plate 25 so that drill guide rods 36 are parallel. A portion of each guide rod 36, as shown in FIGS. 1 and 3 is machined across to provide teeth making each guide rod effectively a rack 38 suitable for meshing with a matching pinion drive, as discussed below.

Drill platform 39 is slidably supported by drill guide rods 36 passing therethrough, and supports the drill elements including the drive motor 41 and gearing box 43. Smooth, even motion of drill platform 39 on drill guide rods 36 is facilitated by journal bearings 40 in the platform.

As shown in FIGS. 1 and 3, drill guide rods 36 lie one on either side of and coplanar with the axis of drill bit 45. The force used to advance drill bit 45 into workpiece 61 in front of it is, therefore, directed along and not at some distance away from guide rods 36. This ensures stable operation without significant turning moments being applied to the rail by the apparatus by the drill-advancing force. This feature is very valuable since the entire support for the apparatus of this invention is obtained from the clamping action acting on a single rail. By comparison, devices like those described in the Stougaard and McIlrath patents, which depend on external support for the apparatus provide guide rods situated well above the workpiece. Such guide rods also have to transmit the external support forces from the ground or a parallel rail and hence are subject to tipping or relative displacement during use, which could affect the accuracy of the drilling operation.

In the embodiment shown in FIGS. 1–3, rotational power for the drill is provided by electric drive motor 41 mounted on drill platform 39. For convenience, the motor control switch 42 is mounted directly on top of the motor housing. Also mounted on drill platform 39, at the drive shaft end of electric motor 41, is a drill gear box 43 which serves to step down the electric motor drive to obtain the necessary torque to turn drill chuck 44.

A hollow parallel sided multi-toothed annular drill bit 45 is held in drill chuck 44 in any of several conventional and convenient ways, e.g., by Allen-head set screws. Centrally positioned within drill chuck 44, and hence within annular hollow drill bit 45, is a long hollow plug ejector rod 46, preferably provided with a hardened plug ejecting point 47 at one end. Hollow plug ejector rod 46 is provided with lateral through apertures 48 through which drill lubricant fluid may be delivered to the center of annular hollow drill bit 45. Drill lubricant fluid, which conventionally is an emulsion of a cutting oil and water for lubricating and cooling the cutting edges in contact with the material being machined, is conveniently stored for this purpose in drill lubricant tank 49 mounted on a shelf attached to the top of clamping plate 25, shown in FIGS. 1 and 2. The drill lubricant fluid is gravity fed along lubricant delivery line 50 to the rear end of plug ejector rod 46. Such a centrally lubricated and cooled annular drill bit with a plurality of cutting teeth, all of which either individually or together have to machine away only a small fraction of the metal ultimately removed to make the hole, provides for long life in use.

Also carried by drill platform 39 are two pinions 51 engaging racks 38 for controlled movement of the platform 39 with respect to drill guide rods 36. Pinions 51 are mounted on a common pinion drive shaft 52 for coordinated movement in response to a controlled torque applied to pinion drive shaft hub 53 by the operator of the apparatus. Pinion drive shaft hub 53 is provided with a plurality of threaded holes 54. Into each such hole may be threaded-in a pinion drive handle 55 which is provided with a threaded end 56 and a non-slip knob 57 at the other end. This is particularly helpful to an operator working in a confined space who does not have enough room for a crank handle or any other conventional means of causing the pinions 51 to turn on the racks 38 to advance or retract the drill bit 45. The operator may, therefore, remove the pinion drive handle 55 and screw it into each successive hole 54 as he advances or retracts the drill bit 45 a short distance.

When the apparatus is being transported, it is most conveniently carried by a single operator, in the embodiment shown in the figures, by handle 58 which is made integral with the drill drive motor housing. Electric motor 41 is provided with an electric power line 59, at the other end of which is provided a conventional three-prong electric plug 60. Clearly, depending on the circumstances, it should be possible for a person skilled in the art to replace electric motor 41 shown in the preferred embodiment by a hydraulically powered motor or a pneumatically driven motor provided with compressed air from available supplies, to power the drill.

An operator of the apparatus of this invention is likely to want to drill a plurality of holes similarly positioned vis-a-vis the profile of a rail or a beam and hence would require only one particular set of gauge blocks. These may therefore be preset for specific types of rails or beams and, once bolted onto the clamping head, may be used repeatedly. Then, if the user has to use the apparatus on a different rail or a different beam, only the pair of gauge blocks needs to be replaced. Note that block setting pins 31 through 34 are threaded into gauge blocks 28 and, therefore, may be moved in or out of gauge blocks 28 to suit a variety of profiles, if this is desired.

In practice, the user would turn clamp locking nut 20 by means of handles 22 to permit movement of clamp 11 away from the gauge blocks 28. The clamp end of the apparatus would then be lowered over the rail 61 and moved so that gauge blocks 28 snugly fit one side of the rail by contact at block setting pins 31–34. Clamp locking nut 20 may then be turned to bring clamp prongs 12 into loose contact with the other side of the rail web at prong tips 13. It should now be possible to slide the drill mechanism along the rail. The user would then look through sight-hole 27 to ensure that the drill mechanism is positioned correctly with respect to a previously made mark where the hole is to be drilled below. Once the user is satisfied that the drill is in position, clamping nut 20 is tightened by means of clamping nut handles 22.

The mechanism is now ready to commence drilling. Note that due to the conjoint action of the slidable clamp-jaws prong tips on one side and the reactive gauge blocks on the other side the entire weight of the drill is supported by the rail without the need for any other support. Thus an operator of this apparatus is freed of the necessity of having a second rail or the adjacent ground for adequate support for the drill apparatus.

The operator plugs in the electric motor to a suitable electrical supply. It is understood that an annular sharpened drill bit 45 has already been tightened in drill chuck 44, and a suitable quantity of drill lubricant has been provided in lubricant tank 49 for delivery at the center of the hollow annular drill when drilling commences. Lubricant flow valve 51 should now be opened to obtain a supply of lubricant. The drill motor is now switched on and the drill bit is advanced by turning the pinion drive axle 52 by means of pinion drive handle 55. Note that plug ejector rod 46 does not advance with the drill bit. As the drill bit drills through the rail, a plug will be formed at the center of the annular space within. When the drill bit finally drills through the rail web, the operator rotates the pinion drive axle back to retract the drill bit from the newly made hole in the rail. As this is done, the central plug is stopped by the hardened point 47 on plug ejector rod 46 and is caused to fall out of the hollow annular drill bit. The drill may now be switched off and moved to another position to drill another hole.

It is important to note that the use of an annular multi-toothed drill bit permits much greater flexibility in drilling and adapting existing holes in rails than is possible with a conventional drill bit. There are two practical situations encountered in laying or repairing rail where this advantage has great significance. In the first instance, when new rail track is being laid, typically in ¼ mile long segments, it is to be expected that each segment will expand and contract over its entire length to a significant degree, because of temperature changes from day to night or from season to season. The holes drilled into the web of such a rail in order to attach fishplates for connection to adjacent rails, therefore, preferably should be somewhat elongated instead of perfectly round. Since these holes often are best made on site it is not convenient to do so with a regular solid or two-fluted drill. However, by means of the annular drill and the clamping mechanism of the present invention, it is possible for a user to first drill a round hole 62 or utilize an existing hole and then position the drill somewhat to the side of the hole, to drill again, e.g., at a new center 63, thereby elongating the hole. See FIG. 8. In a second example, where existing track is worn or damaged locally and is to be repaired by replacement of only the damaged section by a brand new piece of rail, the holes that may be available may be round or may have shifted due to the expansion of the type discussed above over a period of time. With the annular drill bit used with the mechanism as taught in this disclosure, a user can then modify or enlarge an existing hole to a different center 64 to accommodate matching bolts through new fish plates and a new rail segment to make the repairs. See FIG. 9. Thus a competent user can utilize the present invention to perform sensitive modifications or difficult repairs on site, with a minimum of difficulty. This invention therefore highly facilitates the application of a trained worker's skill in making customized repairs or adjustments under difficult circumstances, on individual rails or beams of a variety of cross sections and shapes.

Depending on prevailing circumstances and available power sources, persons skilled in the art may select, for example, an electric motor using mains power, a 115V 10 amp single phase motor with a battery-pack, a small internal combustion engine, a hydraulic or a compressed air motor to operate the apparatus. Likewise, a given mechanism can be powered optionally by one or another source of motor power if more than one source is available. As shown in FIGS. 1 and 2, the carrying handle in the embodiment of the best mode is provided at the end of the motor. Since the entire apparatus of the best mode of this invention (including the drill bit) will weigh only about 54 pounds, an operator can easily lift the entire apparatus by holding onto the clamp locking nut 20 with one hand and the handle of electric motor 41 with the other to carry the apparatus. In the alternative, the user can grasp the handle at the end of the motor 41 and carry the drill in a vertically downward direction. As will be immediately obvious to persons skilled in the art, the length of the apparatus, as such, can be reduced even further by having the drive motor mounted vertically and transmitting power to the gear box via bevel gears through a right angle turn. These and other state of the art modifications are intended to be comprehended within the scope of this disclosure. Likewise, through the use of lighter alloys, e.g., magnesium alloys, the entire apparatus can be made to weigh even less. This low weight makes the apparatus extremely suitable for work in awkward conditions, e.g., in ship building or on girders on high structures, and where holes have to be drilled by the worker located in an awkward position or drilling into overhead beams. Under even more exotic circumstances, e.g., where magnetic fields must be avoided in the vicinity of very sensitive instrumentation, as in a nuclear power facility, the entire apparatus can be made out of non-magnetic materials and powered by means of a hydraulic or pneumatic drive motor and the drill bit made with a custom carbide cutting tip. Under other equally exotic working circumstances, e.g., when drilling holes in beams or girders submerged under salty or corrosive water, the apparatus housing may be made of fiberglass or other non-corrosive materials suitably sealed, and powered by a compressed air drive motor.

It should be apparent from the preceeding that this invention may be practiced otherwise then as specifically described and disclosed herein. Modifications may, therefore, be made to the specific embodiments disclosed here without departing from the scope of this invention and are intended to be included within the claims appended below.

I claim:

1. Apparatus for clamping a power tool to a workpiece, comprising:
   (a) a movable first clamping jaw engageable with a first nonwearing side of said workpiece;
   (b) means for slidably supporting said first clamping jaw on said apparatus;
   (c) a second clamping jaw connected to said support means and having clamping surfaces adjustable in profile to contact in clamping engagement a second nonwearing side of said workpiece in cooperation with said first clamping jaw;
   (d) means mounted on said support means for moving the first clamping jaw towards said second clamping jaw to clamp said workpiece therebetween, and thereby providing sole and total support for said apparatus during operation thereof on said workpiece clamped between said first and second clamping jaws; and
   (e) means spaced from said support means for guiding said first clamping jaw along the support means into clamping contact with said workpiece while maintaining said first clamping jaw in proper alignment with said second clamping jaw, said guiding means including a guide plate connected to a clamp plate head mounted on the support means, said clamp plate head including a line-of-sight hole permitting visual detection of a marked location on said workpiece to facilitate rapid and accurate positioning of said apparatus relative to said marked location on said workpiece.

2. Apparatus of claim 1, further comprising power tool means, attached to said support means and controllably movable with respect thereto, for machining said workpiece.

3. Apparatus of claim 2, wherein said power tool means includes a cutting element and fluid delivery means, cooperating with said cutting element, for delivering a fluid thereto to facilitate efficient machining of said workpiece.

4. Apparatus of claim 3, wherein said cutting element is a drill bit.

5. Apparatus of claim 4, wherein said drill bit has an annular cylindrical portion provided with a plurality of cutting edges at one end thereof.

6. Apparatus of claim 5, wherein said fluid is delivered into a hollow central region of said annular portion of said drill bit to be directed in radially outward flow therefrom at said cutting edges.

7. Apparatus of claim 6, wherein said fluid flowing to said drill bit is gravity fed.

8. Apparatus of claim 5, further comprising plug ejector means located within said annular portion of said drill bit for ejecting therefrom a central plug machined out of said workpiece.

9. Apparatus of claim 2, wherein said power tool means is powered by an alternating current electric motor.

10. Apparatus of claim 2, wherein said power tool is powered by a direct current electric motor.

11. Apparatus of claim 1, wherein said second clamping jaw includes two adjustable gauge block elements for transmitting a plurality of reaction forces to predetermined plural points on said second side of said workpiece.

12. Apparatus of claim 1, further comprising a thrust bearing member on said support means between said first clamping jaw and said moving means for transmitting said clamping force therebetween.

* * * * *